T. SLOPER.
PNEUMATIC CUSHIONING DEVICE FOR AIRCRAFT.
APPLICATION FILED APR. 12, 1917.

1,257,413. Patented Feb. 26, 1918.
6 SHEETS—SHEET 1.

Witnesses
Jesse B. Heller

Inventor
Thomas Sloper

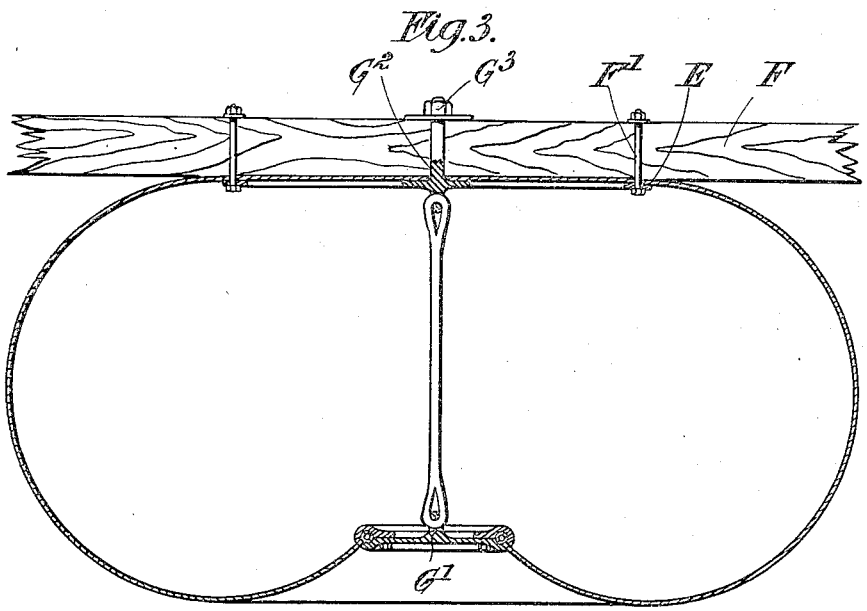
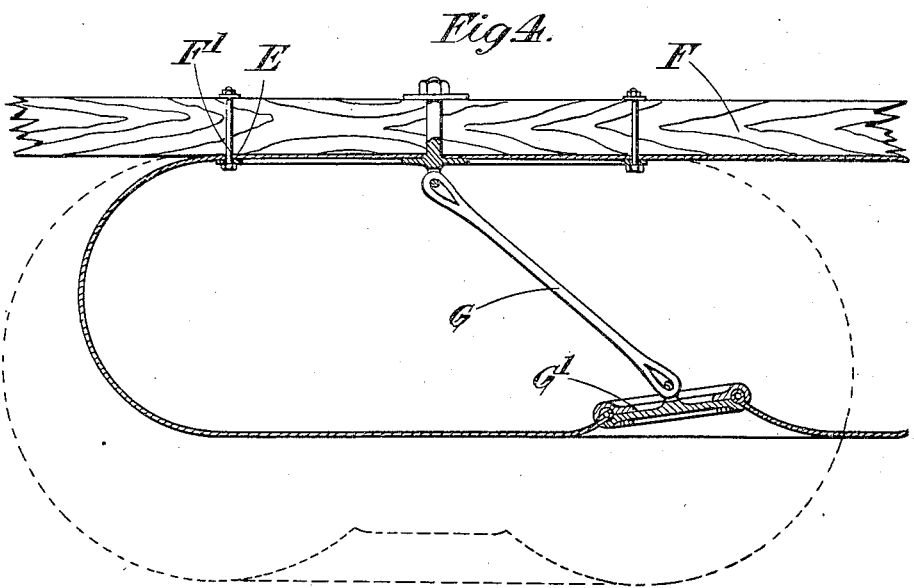

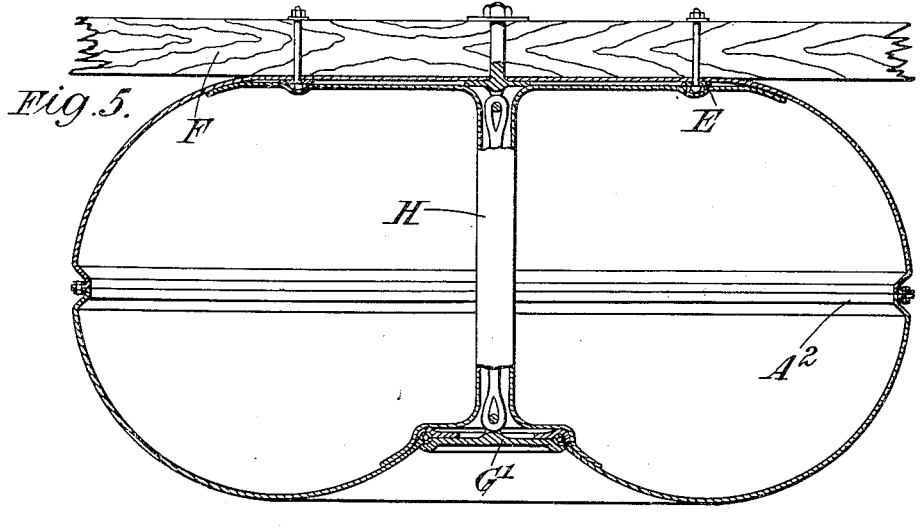
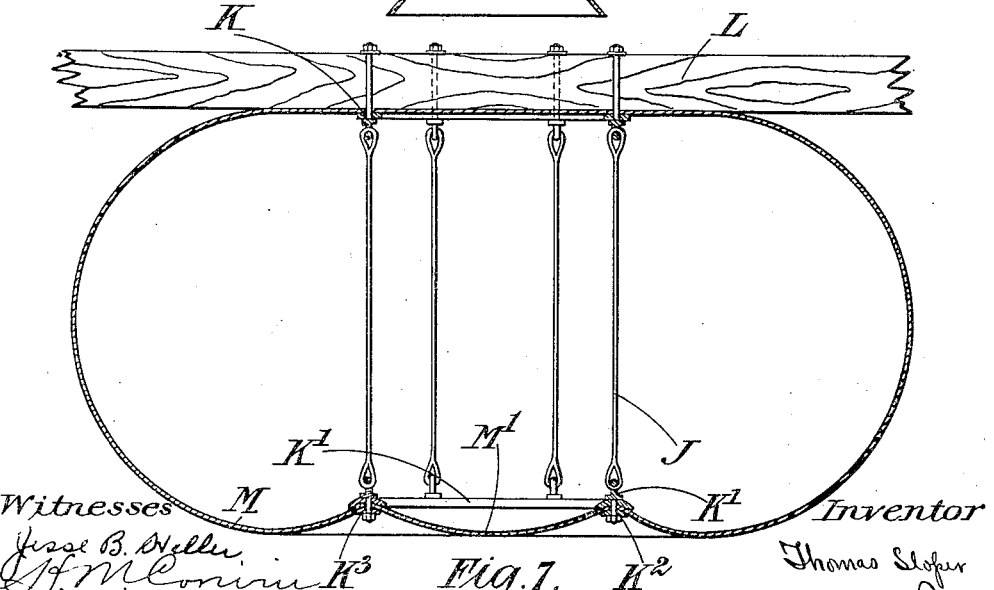

T. SLOPER.
PNEUMATIC CUSHIONING DEVICE FOR AIRCRAFT.
APPLICATION FILED APR. 12, 1917.

1,257,413.

Patented Feb. 26, 1918.
6 SHEETS—SHEET 4.

Witnesses

Inventor
Thomas Sloper

T. SLOPER.
PNEUMATIC CUSHIONING DEVICE FOR AIRCRAFT.
APPLICATION FILED APR. 12, 1917.
1,257,413. Patented Feb. 26, 1918.
6 SHEETS—SHEET 5.
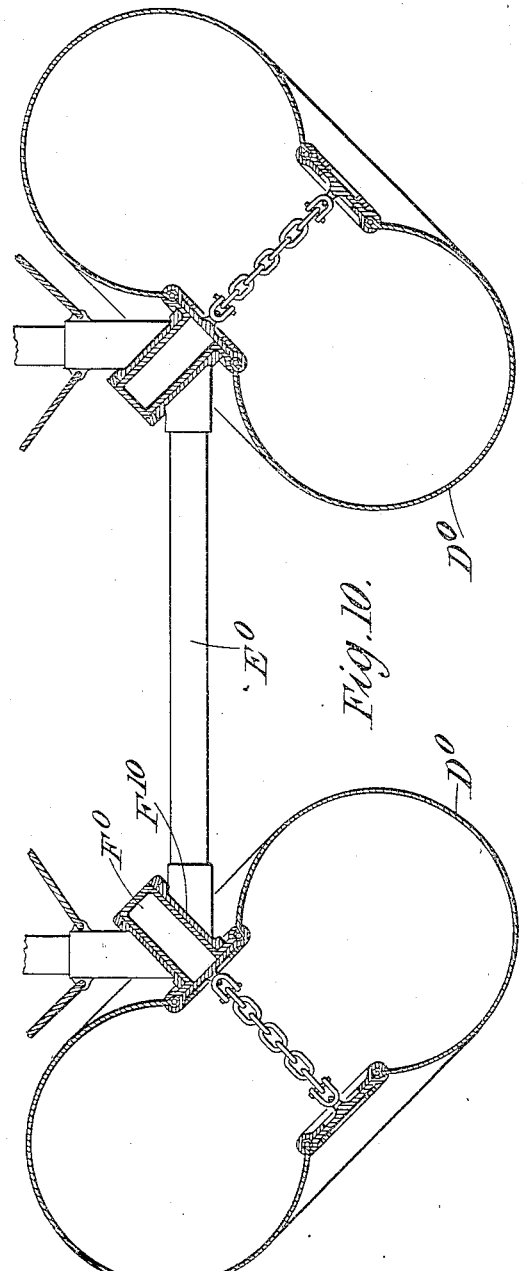
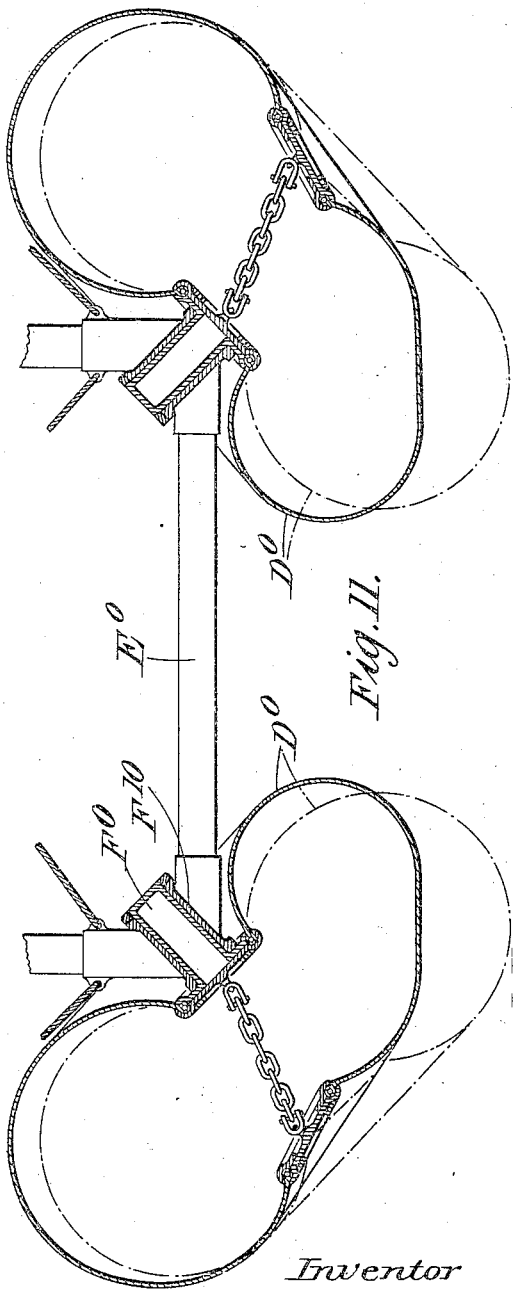

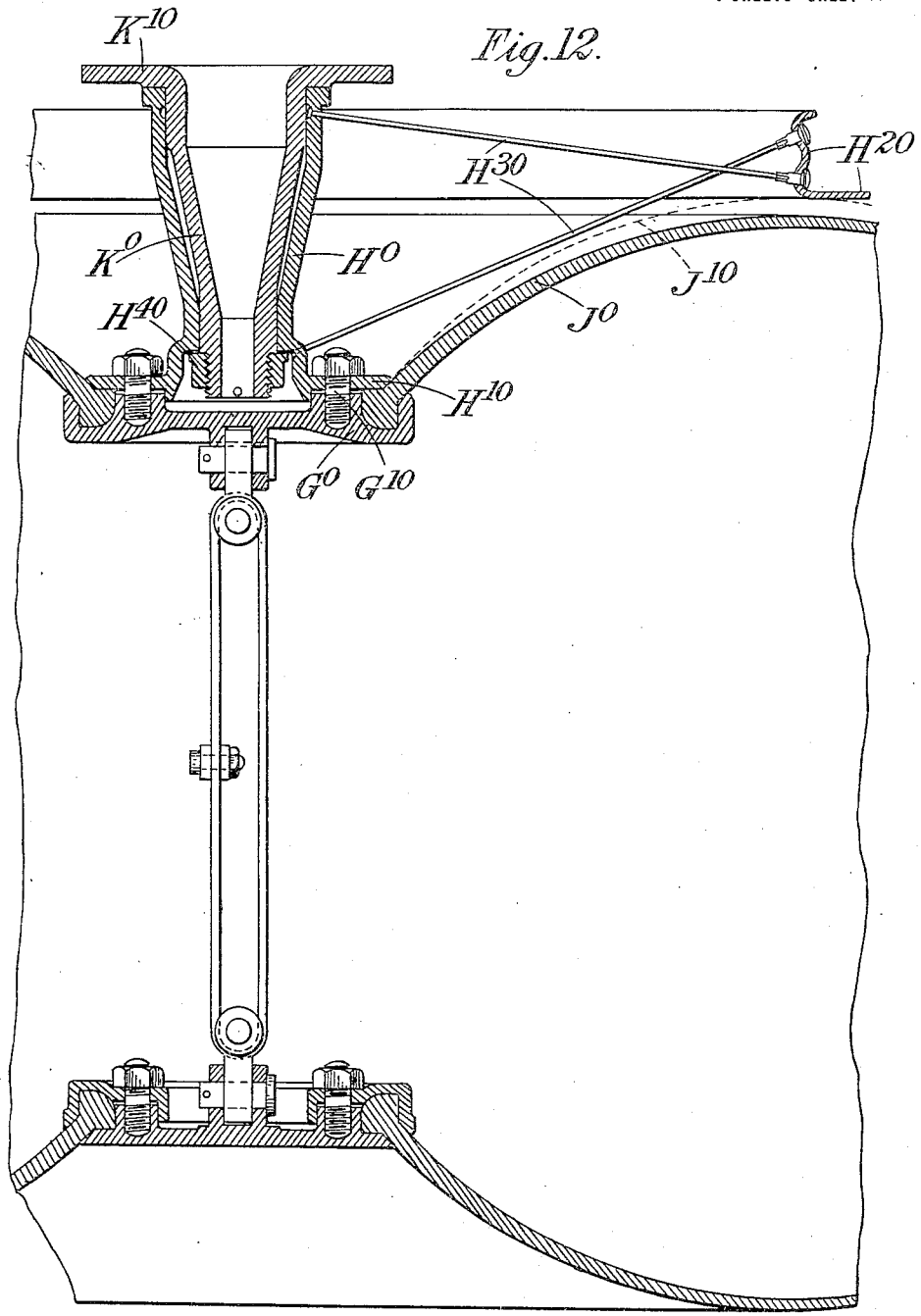

UNITED STATES PATENT OFFICE.

THOMAS SLOPER, OF DEVIZES, ENGLAND.

PNEUMATIC CUSHIONING DEVICE FOR AIRCRAFT.

1,257,413.  Specification of Letters Patent.  Patented Feb. 26, 1918.

Application filed April 12, 1917. Serial No. 161,573.

*To all whom it may concern:*

Be it known that I, THOMAS SLOPER, a subject of the King of England, residing in Devizes, Wiltshire, England, have invented certain new and useful Improvements in Pneumatic Cushioning Devices for Aircraft, of which the following is a specification.

This invention is for improvements in or relating to pneumatic cushioning devices for aircraft.

When airships are landing, the gondola or other part is liable to strike the ground with considerable force, and buffers composed of various materials have been employed to cushion such parts as strike the ground.

According to this invention, the cushioning-device consists of an air-cushion of flexible material having one or more internal ties whereby two opposite sides are drawn in relatively to the positions they would occupy under inflation if free, the air-cushion moreover being so shaped that when tied in, its form is symmetrical or approximately circular in a plane parallel with the tied-in sides, and means are provided for securing one of the tied-in sides to the part to be cushioned, so that any thrust on the other tied-in side tending to displace it laterally relatively to the fixed side will cause a further drawing in which would be resisted by the pneumatic pressure within the chamber and much of the strain caused by the lateral movement of the said side would be transmitted direct to the part to be cushioned, whereby the walls of the chamber are relieved though a limited amount of lateral movement in any direction is permitted.

The tying-in means conveniently takes the form of one or more ties centrally situated within the air-cushion.

In some cases it is desirable to provide a rotatable bearing whereby the cushioning-device is carried on its support, the axis of rotation of the bearing being perpendicular to that drawn-in side of the cushioning-device by which the latter is connected to the support.

In the accompanying drawings which illustrate several methods of carrying out this invention:—

Fig. 3 is a central vertical section through the cushioning-device secured to the side of a frame-member;

Fig. 4 shows the same device distorted under lateral thrust;

Fig. 5 is a central vertical section through a cushioning-device having an internal sealing liner;

Fig. 6 is a central section through the liner;

Fig. 7 is a central vertical section through a further form of cushioning-device;

Fig. 10 is a modified form of double cushioning-device shown in central vertical section, each having a rotatable support;

Fig. 11 is a similar view to Fig. 10 showing the parts in the positions they take when absorbing shock, and Fig. 12 is a central vertical section through a further modified form of rotatably-supported cushioning-device.

The same letters indicate the same parts throughout the drawings.

The air-cushion or pneumatic chamber A is formed of flexible material lined with rubber or otherwise treated to render it air-tight, and the shape is such that if it were inflated with the walls free, it would become more or less spherical. On opposite sides of the walls, plates B, B¹ are secured. The plate B, which for convenience may be termed the upper plate, has in it a socket B² to receive the end of a spar C which constitutes the support for the cushioning-device. This spar may be secured to any convenient part of the air-craft which is to be protected and it may be further steadied by stay-wires $C^1$ attached to lugs on the socket $B^2$. The plates B, $B^1$ are recessed on their upper sides to receive beads $A^1$ which are formed at the edge of orifices provided in the air-cushion, and the beads are clamped into these recesses by coöperating annular plates $B^3$ which are bolted to the plates B, $B^1$.

At the under-side of the plate B is an eye $B^4$ to which one end of a spring D is secured and the upper face of the plate $B^1$ carries a similar eye $B^5$ to receive the other end of the spring D.

Figure 1:
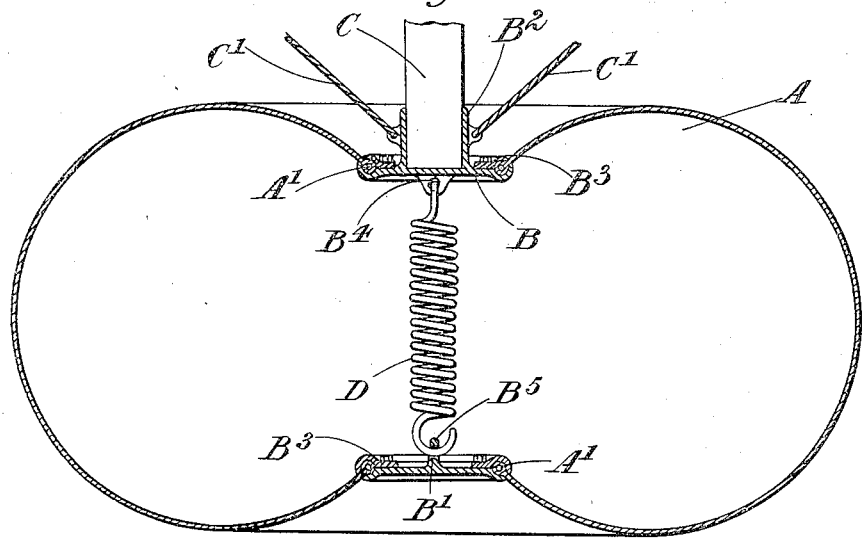
Figure 1 is a central vertical section through the cushioning-device secured to the end of a spar.

The spring D serves as the tie whereby two opposite sides of the air-chamber are held in relatively to the positions they would take if the walls were allowed to expand freely under inflation, so that when inflated the chamber takes the form shown in Fig. 1 instead of an approximately spherical form.

Figure 2:
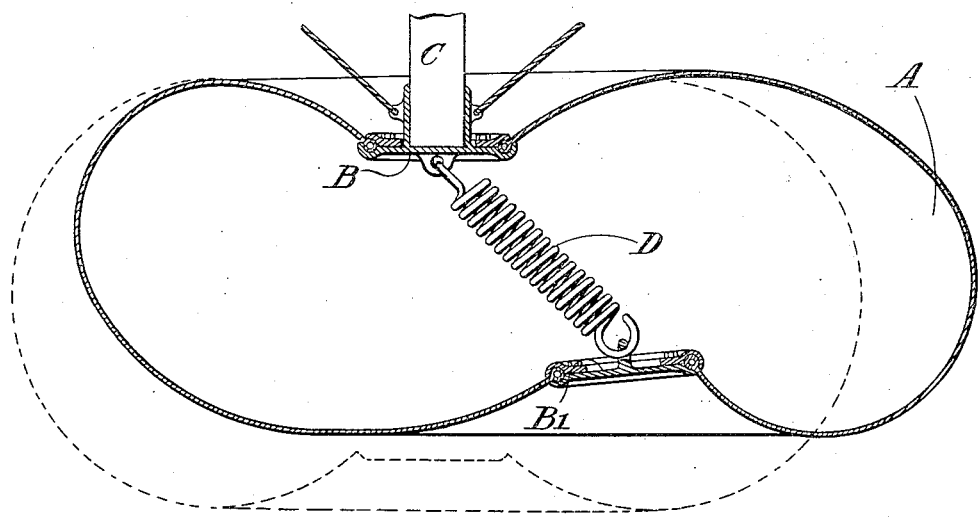
Fig. 2 shows the same device distorted under load and lateral thrust.

It will be appreciated that when an airship is landing, it is almost impossible to so arrange an air-cushion that it will receive the thrust in a direction perpendicular to the member supporting it, as the machine is not only moving downward toward the earth but may be also moving forward or sidewise, and it is this lateral thrust given to the cushioning-device which has been difficult to provide for. With a cushioning-device such as is shown in Figs. 1 and 2, lateral thrust deforms the air-chamber so that the walls take the position shown in Fig. 2 which appreciably decreases the interior cubic capacity and therefore the movement is forcibly resisted by the pneumatic pressure maintained within the chamber. Lateral thrust upon the cushion tends to lengthen the tie D and it is owing to the fact that this cannot be appreciably lengthened that the pneumatic resistance offered to the distortion is considerable. Where a spring is used, as in the case shown in Figs. 1 and 2, the length of the tie can be increased slightly but only against the tension of the spring which is powerful enough to remain practically unextended when under normal tension, yet is able to yield a little when the air-cushion is submitted to any particularly violent lateral shock.

If desired, the air-cushion may be secured to its support by a ring E, Fig. 3, mounted inside the air-chamber and secured to the supporting-member F by bolts $F^1$. In such case the central tie G may be secured to the bottom plate $G^1$ as before and at the top to a bolt $G^2$ which extends through the wall of the chamber and through the support F to which it is secured by a nut $G^3$. The tie G may be of flexible material or it may be in the form of a rigid link and the distortion of the chamber when lateral thrust is applied is shown in Fig. 4.

The ring E instead of being connected direct to the supporting-member F could be secured to an outer ring, which outer ring would be ultimately secured to the support F. This would enable an airtight seal to be made between the inner and outer rings which would not be disturbed by the means for securing the air-cushion to the supporting-member.

To provide against leakage of air at the points where the connections are made for tying-in the walls of the air-chamber or securing the air-chamber to a support, an internal liner H, Figs. 5 and 6, may be provided. The liner comprises a tubular portion to inclose the tie, and upper and lower laterally extended portions to cover the tying-in plates or fastening-means. In Fig. 6, the upper laterally extended portion takes the form of a disk which is large enough to extend right over the ring E whereby the air-cushion is secured to the support F, and the bottom lateral enlargement is cup-shaped to inclose the plate $G^1$ and effect an airtight seal between it and the walls of the chamber. Where such a liner is applied to a construction such as shown in Figs. 1 and 2, both end enlargements would be cup-shaped to inclose the plates B, $B^1$ respectively.

If the cushion has a recess at the top, as shown in Fig. 1, this liner may be employed to allow any water which accumulates in such recess to drain away through the cushion, or an independent flexible tube may be employed for this purpose.

In some cases it may be preferred to employ more than one central tie. In Fig. 7 a series of ties J are shown arranged in a circle. The ties are attached at their upper ends to a ring K which is bolted to a support L, as described with reference to the ring E in Fig. 3, but the lower ends instead of being attached to a plate are connected to a ring $K^1$ which is secured to the fabric by means of bolts $K^2$ which extend through the fabric and engage an outside ring $K^3$. This construction provides a greater contact area at the bottom of the cushioning-device, as not only the part of the wall M of the chamber which lies outside the ring can make contact with the ground or other object, but also the part $M^1$ of the wall which lies within the ring $K^1$.

The tying-in means shown in the drawings is in all cases freely hinged at its ends, so that this does not impede the distortion of the air-cushion except in the endwise direction of the tying-in device.

The shape of the air-cushion in cross-section in a plane parallel with the tied-in sides, is in all cases symmetrical or approximately circular, so that whatever portion of it strikes the ground its action is approximately the same.

Figure 8:
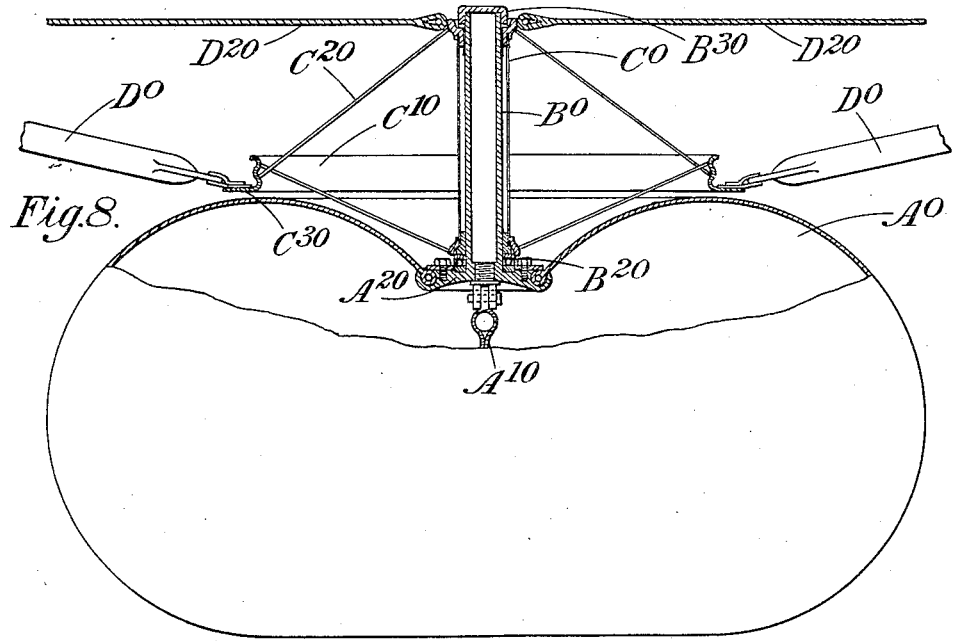
Fig. 8 is an elevation of a cushioning-device mounted rotatably on its support, the said rotatable part being shown in central vertical section.

The air-chamber $A^0$ shown in Fig. 8 is tied in top and bottom by a link $A^{10}$ which engages plates secured in the top and bottom walls of the chamber, the upper plate $A^{20}$ only being shown in the drawing. The sides thus tied in constitute what may conveniently be referred to as the flattened sides of the device as these are held in so that they cannot take the more or less spherical form which otherwise the chamber would take under inflation, and one of these flattened sides is provided with means for connection to a support, the means shown in Fig. 8 being such as to allow the chamber $A^0$ to rotate about an axis perpendicular to the flattened side by which it is connected to its support.

For this purpose in Fig. 8 there is made integral with the plate $A^{20}$ or otherwise secured thereto a hollow spindle $B^0$ which is mounted in bearings provided in a hub-member $C^0$ of a wire-wheel whereof the rim is indicated at $C^{10}$ and the spokes at $C^{20}$. At that end of the hub-member which is nearest the chamber $A^0$, a ball-bearing $B^{20}$ is provided which takes the thrust between the plate $A^{20}$ and the end of the hub $C^0$. The spindle $B^0$ is held in place by a cap $B^{30}$ and is quite free to rotate in the hub $C^0$.

Figure 9:
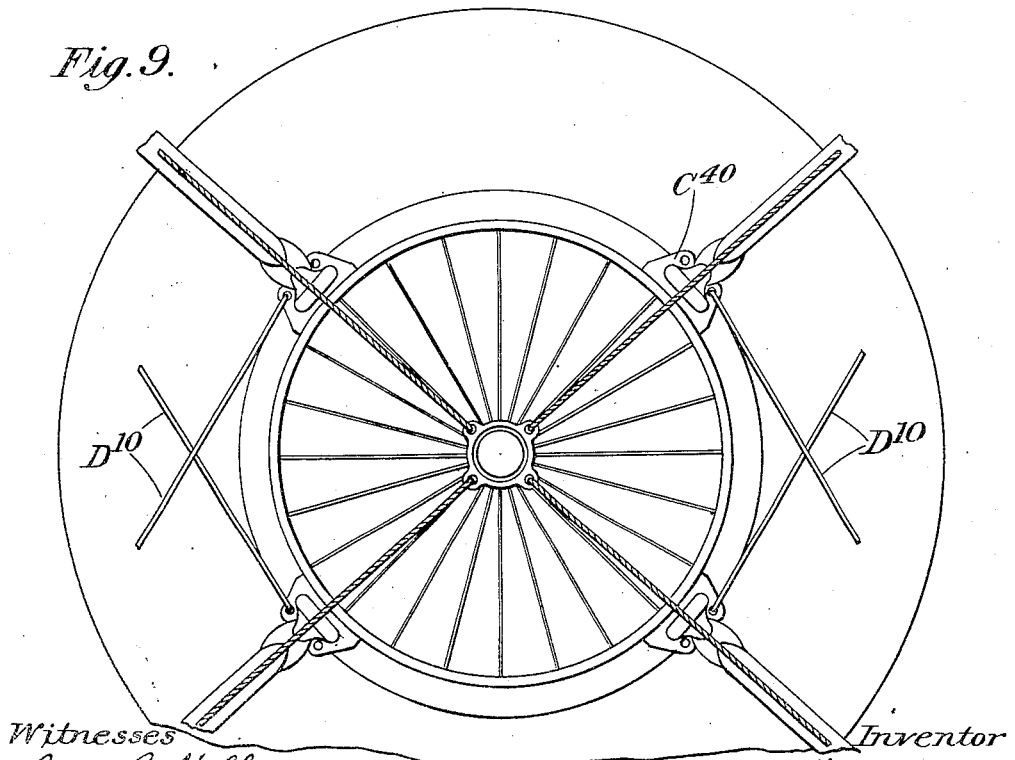
Fig. 9 is a plan of the same parts.

The rim $C^{10}$ is conveniently made approximately L-shaped so that a flange $C^{30}$ is provided to which struts $D^0$ may be secured and which provides a support against which the top of the chamber can be thrust when under load. There may be four of these, as shown in Fig. 9, extending radially from the rim, and their further ends, which are not shown in the drawings, may be secured in any convenient manner to the aircraft with which the apparatus is intended to be used. The flange $C^{30}$ or lugs $C^{40}$ secured thereto to receive the struts $D^0$, may also be employed to receive tangential ties $D^{10}$ whereby the rim is further connected to the aircraft to prevent any rotary movement of the wheel. The struts $D^0$ provide a light frame which will prevent the cushioning-device from being thrust vertically upward, but if it should be tilted, the struts might invert and instead of inclining downward to the cushioning-device, as shown in Fig. 8, they would be forced into an upwardly inclined position. To prevent this, the upper end of the hub $C^0$ is connected by ties $D^{20}$ to the aircraft so that it cannot be swung out of the vertical position relatively to the aircraft, supposing this to be horizontal.

It will be appreciated that the cushioning-device rotatably mounted, not only absorbs shock, but if it strikes the ground when tilted with the spindle $B^0$ out of the vertical position, it will roll on the ground as the aircraft continues its movement instead of being dragged over the ground and thereby becoming unnecessarily damaged.

It will be observed that the wire-wheel $C^0$, $C^{10}$, $C^{20}$, constitutes a light and strong support for the cushioning-device.

To prevent the rim of the wheel from cutting the chamber $A^0$, an annular plate may be secured to the latter. Obviously the struts $D^0$ and ties $D^{20}$ may change place, or other means may be provided to take the end-thrust of the spindle $B^0$ and ties only employed both for the rim and the upper end of the hub.

It is not necessary that the axis of rotation of the cushioning-device, when the latter is mounted rotatably, should be vertical when the aircraft is horizontal, but the bearing may be arranged so that its axis of rotation is at any convenient angle.

In Fig. 10, two cushioning-devices $D^0$ are shown carried at the corners of a frame $E^0$. This frame is intended to project vertically downward from the aircraft and the chambers $D^0$ are carried by spindles $F^0$ which rotate in sockets $F^{10}$ secured to the frame. The axis of rotation of the spindles is set at an angle of 45° to the bottom member of the frame, which member would be horizontal when the aircraft is horizontal. The two spindles $F^0$ are inclined toward each other and lie in the same transverse plane relatively to the fore and aft direction of the aircraft, so that the cushioning-devices face outward away from the sides of the frame $E^0$ which sides would be toward the sides of the aircraft. The spindle $F^0$ may, however, be set at any angle in relation to the aircraft.

With such an arrangement, the cushioning-devices are distorted as shown in Fig. 11 when the aircraft strikes the ground on a laterally level keel and can roll on the ground as the aircraft moves, the cushioning-devices virtually constituting wheels whose tops are splayed apart.

In Fig. 12 a cushioning-device is shown whose upper plate $G^0$ is bolted by bolts $G^{10}$ to a flange $H^{10}$ on a hub-member $H^0$. The hub-member carries a rim $H^{20}$ to which it is connected by spokes $H^{30}$, and the rim is approximately L-shaped as described with reference to the rim $C^{30}$ of Figs. 8 and 9. The rim, however, is not in this case connected by struts to the aircraft as it rotates with the air-chamber $J^0$, freely, on a fixed spindle $K^0$. The spindle $K^0$ may be bolted by a flange $K^{10}$ to any suitable part of the aircraft and the hub $H^0$ is kept in place thereon by a nut $H^{40}$.

The object of this arrangement is that the lower portion of the rim $H^{20}$ may serve as a support for the air-chamber when this is under load. Normally the wall of the chamber lies away from the flange of the rim as shown, but when the chamber is under stress, the wall is forced out against the rim and may take the position indicated by the chain-line $J^{10}$.

What I claim as my invention and desire to secure by Letters Patent is:—

1. In a cushioning-device for aircraft, the combination of, an air-cushion of flexible material, an internal tie whereby two opposite sides of the air-cushion are drawn in relatively to the positions they would occupy under inflation if free, the air-cushion moreover being so shaped that when tied in its cross-section in any plane parallel with the tied-in sides is approximately of circular form, and means for securing one of the tied-in sides to the part to be cushioned, substantially as set forth.

2. In a cushioning-device for aircraft, the combination of, an air-cushion of flexible material, an internal tie situated centrally within the air-cushion and connected at its two opposite ends to two opposite sides thereof so that they are drawn in relatively to the positions they would occupy under inflation if free, the air-cushion moreover being so shaped that when tied-in its cross-section in any plane parallel with the tied-in sides is approximately of circular form, and means for securing one of the tied-in sides to the part to be cushioned, substantially as set forth.

3. In a cushioning-device for aircraft the combination of, an air-cushion of flexible material, an internal tie whereby two opposite sides of the air-cushion are drawn in relatively to the positions they would occupy under inflation if free, the air-cushion moreover being so shaped that when tied-in its cross-section in any plane parallel with the tied-in sides is symmetrical in shape, means for securing one of the tied-in sides to the part to be cushioned, and a sealing-liner within the chamber which liner is in the form of a tube having enlargements at each end and is situated with the tubular portion around the tie with the enlargements extending over the connections between the tie and the wall of the air-cushion and making a hermetical seal with the interior of said walls so that leakage cannot take place at the points where the ties fasten to the walls, substantially as set forth.

4. In a cushioning-device for aircraft the combination of, an air-cushion of flexible material, an internal tie whereby two opposite sides of the air-cushion are drawn in and thus flattened relatively to the shape they would assume under inflation if free, the air-cushion moreover being further so shaped that when tied-in its cross-section in any plane parallel with the tied-in sides is symmetrical in shape, and a rotatable bearing having one of its members secured to one of the flattened sides of the air-cushion and the other provided with means for securing it to the part to be cushioned, the axis of the bearing being perpendicular to the said flattened side, substantially as and for the purpose set forth.

5. In a cushioning-device for aircraft the combination of, an air-cushion of flexible material, an internal tie whereby two opposite sides of the air-cushion are drawn in and thus flattened relatively to the shape they would assume under inflation if free, the air-cushion moreover being further so shaped that when tied-in its cross-section in any plane parallel with the tied-in sides is symmetrical in shape, a support for the cushioning-device shaped like a wire-wheel, a bearing-member rotatably mounted in the hub of the wheel-like support, and means for securing one of these parts to one of the flattened sides of the cushion with the axis of the bearing perpendicular to the said flattened side so that the other member can be secured to the part to be cushioned thereby allowing the cushion to rotate relatively to the said part, substantially as set forth.

6. In a cushioning-device for aircraft the combination of, an air-cushion of flexible material, an internal tie whereby two opposite sides of the air-cushion are drawn in and thus flattened relatively to the shape they would assume under inflation if free, the air-cushion moreover being further so shaped that when tied-in its cross-section in any plane parallel with the tied-in sides is symmetrical in shape, a support for the cushioning-device shaped like a wire-wheel, a bearing-member rotatably mounted in the hub of the wheel-like support, and means for securing one of these parts to one of the flattened sides of the cushion with the axis of the bearing perpendicular to the said flattened side so that the other member can be secured to the part to be cushioned thereby allowing the cushion to rotate relatively to the said part, the rim of the wire-wheel moreover having a bedding flange to support the cushion when it is forced back against it, substantially as set forth.

7. In a cushioning-device for aircraft, the combination of, an air-cushion of flexible material, an internal tie whereby two opposite sides of the air-cushion are drawn in and thus flattened relatively to the shape they would assume under inflation if free, the air-cushion moreover being further so shaped that when tied-in its cross-section in any plane parallel with the tied-in sides is symmetrical in shape, an axle-member for supporting the cushioning-device provided with means for securing it to the part to be cushioned, a hub-member for the axle having a flange whereby it is secured to one of the flattened sides of the cushioning-device so that the axis of the hub-member is perpendicular to the said flattened side, means for rotatably carrying the hub-member on the axle, and a wire-wheel mounted on the hub-member the plane in which the rim of the wheel lies being parallel to the flattened side of the air-cushion and said wheel having a flange on that side which is toward the air-cushion, which flange projects in a plane parallel to the flat side of the cushion and serves as a support when the cushion is deformed, substantially as set forth.

8. A cushion device for air craft, comprising a flexible air cushion of general spherical form with flattened portions opposite each other when inflated, means for securing one of the flattened portions to the part to be cushioned, and flexible means for securing the flattened portions to each other; substantially as described.

9. A cushion device for air craft, comprising a flexible air cushion of general spherical form with flattened portions opposite each other when inflated, means for securing one of the flattened portions to the part to be cushioned, and a resilient tie connecting the flattened portions to each other; substantially as described.

In testimony whereof I have signed my name to this specification.

THOMAS SLOPER.